UNITED STATES PATENT OFFICE.

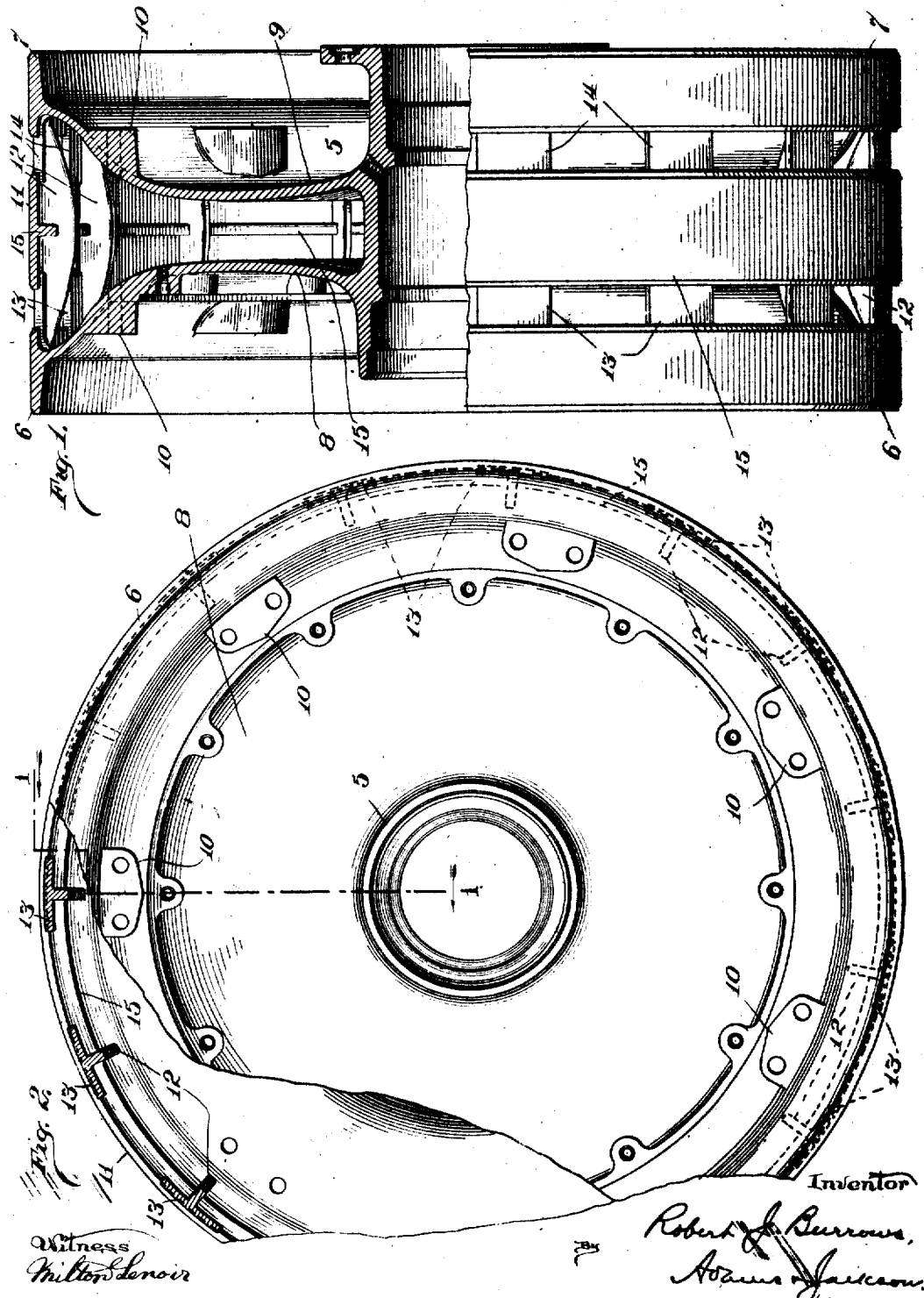

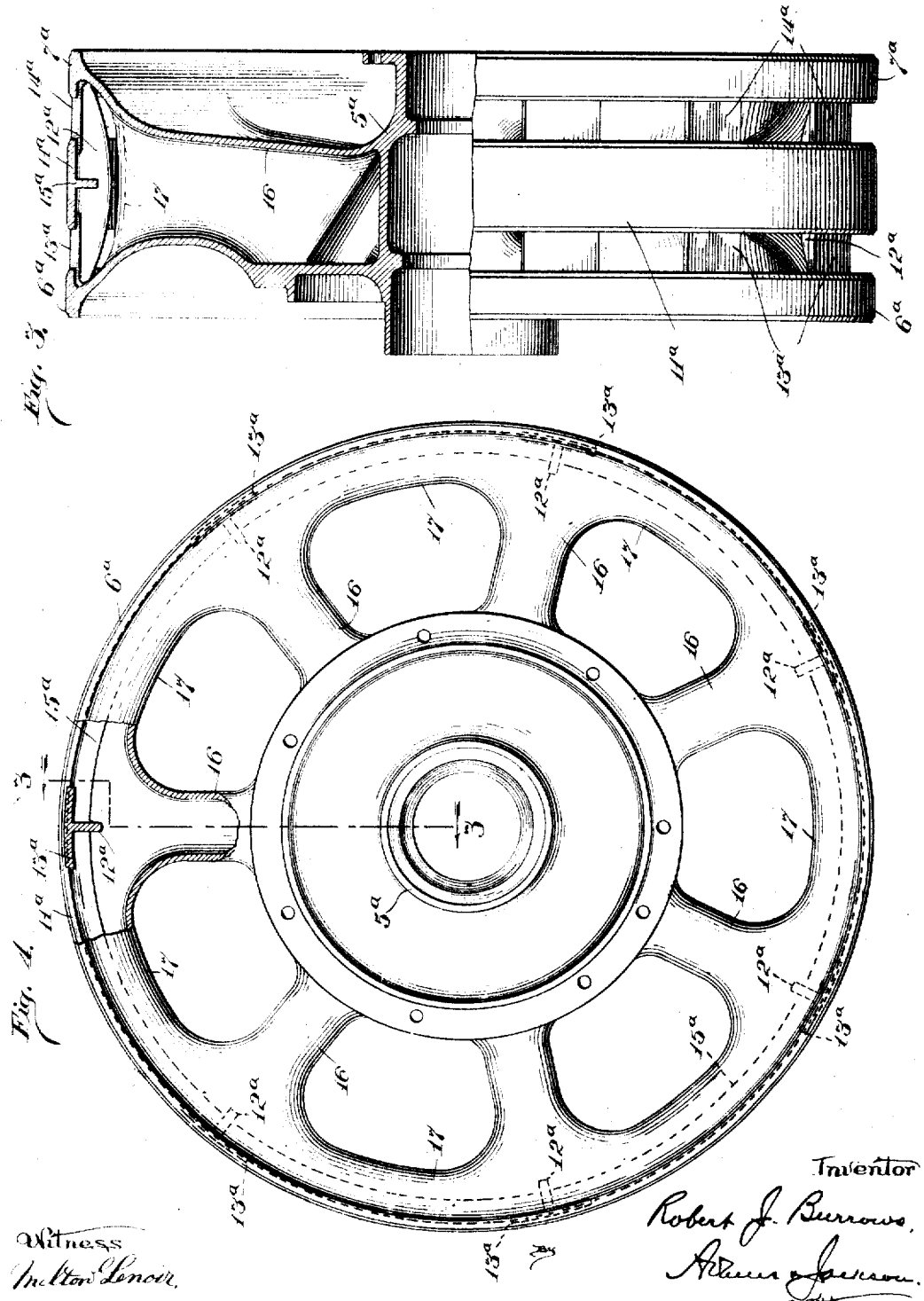

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

METAL WHEEL.

1,405,184.     Specification of Letters Patent.     Patented Jan. 31, 1922.

Application filed May 29, 1919. Serial No. 300,586.

*To all whom it may concern:*

Be it known that I, ROBERT J. BURROWS, a citizen of the United States, and a resident of Buchanan, in the county of Berrien and State of Michigan, have invented certain new and useful Improvements in Metal Wheels, of which the following is a specification, reference being had to the accompanying drawings.

My invention relates to metal wheels, and particularly to wheels designed for heavy service, such as those used on motor trucks. It has for its object to provide a new and improved wheel which may readily be manufactured by a casting process, which will possess the necessary resiliency and strength to successfully resist the severe strains to which such wheels are subjected, and which will also be comparatively light in weight. A further object is to provide an improved construction which may be advantageously employed either in wheels of the disc type or in spoke wheels. I accomplish these objects as illustrated in the drawings and as hereinafter described. What I believe to be new and desire to cover by Letters Patent is set forth in the claims.

In the accompanying drawings:

Fig. 1 is a view partly in transverse vertical section, illustrating a wheel of the disc type embodying my invention, being a partial sectional view on line 1—1 of Fig. 2;

Fig. 2 is principally a side elevation of the wheel shown in Fig. 1, some parts being in section;

Fig. 3 is a view similar to Fig. 1, showing my improvements applied to a wheel of the spoke type, said view being a partial vertical section on line 3—3 of Fig. 4; and Fig. 4 is a side elevation of the wheel shown in Fig. 3, some parts being in section.

Referring first to the construction shown in Figs. 1 and 2, 5 indicates the hub of the wheel, and 6—7 indicate outer or marginal rim members which are respectively connected with the hub by discs 8—9 which are integrally connected with said rim members and with the hub, as shown in Fig. 1. In the embodiment of my invention illustrated these parts are all cast integral with each other, and the discs 8—9 are oppositely-curved or dished from the hub to a point near the rim members, where they are oppositely-curved to a slight extent so as to meet the rim members at a greater angle. Thus the rim members are strongly supported by the hub, but sufficient resiliency is obtained to permit the wheel to withstand severe shocks and strains without damage. In the construction shown, the discs 8—9 are provided with bosses 10 at intervals around the wheel for the attachment of anti-skid devices, but these are not essential.

11 indicates an intermediate rim member which is disposed between the marginal rim members 6—7 and is spaced apart from them, as shown in Fig. 1. The intermediate rim member 11 is connected with the marginal rim members 6—7, and the marginal rim members are connected together and the entire rim structure effectively braced, together by a series of transversely-disposed internal ribs or trusses 12, best shown in Fig. 1. These ribs are disconnected from the intermediate portions of the discs 8—9, but are integrally connected at their end portions with the marginal rim members 6—7 and with said discs at the point of their juncture with said rim members, and extend under the intermediate rim member 11, with which also they are integrally connected. The intermediate portion of these ribs is wider than the end portions thereof so as to give additional strength at the central portion of the wheel, and preferably their inner margins are made convex, as shown. Also their end portions are provided with flanges 13—14 which extend laterally at both sides thereof and connect the adjacent margins of the rim members 6—11 and 7—11, respectively, so as to further strengthen the connections at those points. The outer surfaces of the flanges 13—14 lie below the outer surfaces of the rim members 6—7—11 so that they do not interfere with the machining of the wheel. As a further means of strengthening the wheel, the intermediate rim member is provided with internal circumferentially-disposed ribs 15 which are integrally connected with the several transverse ribs 12, as shown in Figs. 1—2, and serve to connect said ribs together as well as to provide additional support for the intermediate rim member. In the wheel illustrated these parts are all cast integral with each other, and combine to produce a wheel which possesses the desirable qualities hereinbefore mentioned as the objects of my invention. Important advantages of making the transverse ribs 12 independent of the intermediate portions of the discs 8—9 which connect the rim members 6—7 with the hub are that the wheel may be more successfully manufactured by a casting process as the danger of fracture from shrinkage strains is avoided, and the full resiliency of the discs 8—9 is preserved.

In the construction shown in Figs. 3—4, instead of using the discs 8—9 to connect the rim structure with the hub, I employ a series of hollow spokes 16, the inner end portions of which are connected with the hub 5ª, while their outer end portions are flared or curved outwardly at the sides of the wheel and connected with the marginal rim members 6ª—7ª, as shown in Fig. 3. The several spokes 16 are connected with each other by intermediate bridging portions 17 which merge with the outer flared portions of the spokes 16, as shown in Fig. 4, and also connect with the lateral rim members 6ª—7ª, so that the rim members are continuously supported circumferentially of the wheel. The rim structure of the wheel shown in Figs. 3—4 is in other respects the same as that shown in Figs. 1—2, the several parts being indicated by the same reference numerals with the addition of the exponent a. In this type of wheel also the transverse ribs 12ª are independent of the intermediate portions of the devices, in this instance the spokes, which connect the rim members with the hub.

It will be understood that my improved wheel may be provided with the usual driving gear and brake drum when used on the rear axle of a truck, but such parts have nothing to do with my present invention, and as the manner in which they are applied is well understood by those familiar with the art, it is not believed to be necessary to illustrate them. Also the tire is not shown as it may be applied to the wheel in any suitable way.

What I claim as my invention and desire to secure by Letters Patent, is—

1. A metal wheel comprising opposite marginal rim members spaced apart, a hub, means connecting said rim members with the hub, and internal trusses bridging and fixedly connected with the opposite rim members independently of said connecting means.

2. A metal wheel comprising marginal rim members and an intermediate rim member, said rim members being spaced apart, a hub, means connecting said marginal rim members with the hub, and internal ribs independent of the intermediate portions of said connecting means and bridging said marginal rim members, said ribs being fixedly connected with all said rim members.

3. A metal wheel comprising parallel rim members spaced apart, a hub, means connecting said rim members with the hub, and internal ribs independent of the intermediate portions of said connecting means and integrally connected with said rim members, said ribs having laterally-projecting flanges at their end portions.

4. A metal wheel comprising parallel rim members spaced apart, a hub, means connecting said rim members with the hub, and internal ribs independent of the intermediate portions of said connecting means and integrally connected with said rim members, said ribs having laterally-projecting flanges at their end portions, the outer surfaces of said flanges being below the outer surfaces of said rim members.

5. A metal wheel comprising opposite marginal rim members spaced apart, a hub, means connecting said rim members with the hub, internal transverse trusses fixedly connected with said rim members, and circumferentially-disposed ribs connecting said transverse trusses.

6. A metal wheel comprising marginal rim members and an intermediate rim member, said rim members being spaced apart, a hub, means connecting said marginal rim members with the hub, transverse ribs integrally connected with said rim members, and circumferential ribs connected with said intermediate rim member.

7. A metal wheel comprising marginal rim members and an intermediate rim member, said rim members being spaced apart, a hub, means connecting said marginal rim members with the hub, transverse ribs integrally connected with said rim members, and circumferential ribs connected with said intermediate rim member and with said transverse ribs.

8. A metal wheel comprising marginal rim members and an intermediate rim member, said rim members being spaced apart, a hub, means connecting said marginal rim members with the hub, transverse ribs integrally connected with said rim members, and laterally-disposed flanges carried by said ribs and connected with the adjacent rim members.

9. A metal wheel comprising marginal rim members and an intermediate rim member, said rim members being spaced apart, a hub, means connecting said marginal rim members with the hub, transverse ribs integrally connected with said rim members, and laterally-disposed flanges carried by said ribs and connected with the adjacent rim members, the outer surfaces of said flanges being below the outer surfaces of said rim members.

10. A metal wheel comprising marginal rim members and an intermediate rim member, said rim members being spaced apart, a hub, means connecting said marginal rim members with the hub, transverse ribs integrally connected with said rim members, laterally-disposed flanges carried by said ribs and connected with the adjacent rim members, and circumferential ribs connected with said transverse ribs and with said intermediate rim member.

11. A metal wheel comprising marginal rim members and an intermediate rim member, said rim members being spaced apart, a hub, means connecting said marginal rim members with the hub, transverse ribs integrally connected with said rim members, and circumferential ribs connected with said transverse ribs.

ROBERT J. BURROWS.